United States Patent
Kim et al.

(10) Patent No.: US 9,667,077 B2
(45) Date of Patent: May 30, 2017

(54) CORDLESS CHARGING APPARATUS

(71) Applicant: Samsung Electronics Co., Ltd., Gyeonggi-do (KR)

(72) Inventors: Ki-Hyun Kim, Gyeonggi-do (KR); Kil-Soo Ko, Gyeonggi-do (KR); Se-Ho Park, Gyeonggi-do (KR); Jeong-Seok Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 35 days.

(21) Appl. No.: 14/073,367

(22) Filed: Nov. 6, 2013

(65) Prior Publication Data
US 2014/0132211 A1    May 15, 2014

(30) Foreign Application Priority Data

Nov. 12, 2012    (KR) ...................... 10-2012-0127160

(51) Int. Cl.
*H02J 7/00*    (2006.01)
*H02J 7/02*    (2016.01)
*H02J 5/00*    (2016.01)

(52) U.S. Cl.
CPC ............ *H02J 7/0044* (2013.01); *H02J 7/025* (2013.01); *H02J 5/005* (2013.01)

(58) Field of Classification Search
CPC ............ H02J 7/025; H02J 5/005; H02J 50/10
USPC ........................................................ 320/108
See application file for complete search history.

(56) References Cited

U.S. PATENT DOCUMENTS

| | | | |
|---|---|---|---|
| 8,260,199 B2 | 9/2012 | Kowalski | |
| 2006/0126304 A1 | 6/2006 | Smalc et al. | |
| 2006/0293098 A1 | 12/2006 | Lin | |
| 2007/0182367 A1* | 8/2007 | Partovi | 320/108 |
| 2008/0290840 A1 | 11/2008 | Paul et al. | |
| 2009/0096413 A1* | 4/2009 | Partovi et al. | 320/108 |
| 2009/0175045 A1 | 7/2009 | Shen | |
| 2009/0215508 A1 | 8/2009 | Huang et al. | |
| 2010/0059202 A1 | 3/2010 | Li et al. | |
| 2011/0050164 A1* | 3/2011 | Partovi et al. | 320/108 |
| 2011/0084657 A1* | 4/2011 | Toya et al. | 320/108 |
| 2011/0128714 A1* | 6/2011 | Terao et al. | 361/807 |
| 2012/0024505 A1* | 2/2012 | Yoon et al. | 165/133 |
| 2012/0039037 A1 | 2/2012 | Hsieh et al. | |
| 2012/0146576 A1* | 6/2012 | Partovi | 320/108 |
| 2012/0262109 A1* | 10/2012 | Toya et al. | 320/108 |
| 2012/0268238 A1* | 10/2012 | Park et al. | 340/5.8 |
| 2013/0088191 A1* | 4/2013 | Sutarwala et al. | 320/108 |
| 2013/0307468 A1* | 11/2013 | Lee et al. | 320/108 |

(Continued)

FOREIGN PATENT DOCUMENTS

| | | |
|---|---|---|
| JP | 2006339017 | 12/2006 |
| JP | 2007019512 | 1/2007 |

(Continued)

*Primary Examiner* — Suchin Parihar
(74) *Attorney, Agent, or Firm* — The Farrell Law Firm, P.C.

(57) ABSTRACT

A cordless charging apparatus is provided. The cordless charging apparatus includes a charging pad, an electronic device including a charging module which is disposed on the charging pad and is electrically conducted so as to cordlessly charge a battery with electric power, and a dispersing member which is disposed in the charging pad and disperses heat generated in the charging module to the charging pad.

7 Claims, 8 Drawing Sheets

(56) References Cited

U.S. PATENT DOCUMENTS

| | | | |
|---|---|---|---|
| 2014/0002017 A1* | 1/2014 | Kim et al. | 320/108 |
| 2014/0062392 A1* | 3/2014 | Lofy et al. | 320/108 |
| 2014/0077758 A1* | 3/2014 | Kaushik et al. | 320/108 |
| 2014/0139179 A1* | 5/2014 | Chen | 320/108 |
| 2014/0146477 A1* | 5/2014 | Youn | 361/705 |
| 2014/0253025 A1* | 9/2014 | Van Wiemeersch et al. | 320/108 |
| 2014/0285967 A1* | 9/2014 | Wikander et al. | 361/679.54 |
| 2015/0054450 A1* | 2/2015 | Chen et al. | 320/108 |
| 2015/0145475 A1* | 5/2015 | Partovi et al. | 320/108 |
| 2016/0170454 A1* | 6/2016 | Aurongzeb et al. | 320/108 |
| 2016/0254690 A1* | 9/2016 | Helberg et al. | 320/108 |

FOREIGN PATENT DOCUMENTS

| | | |
|---|---|---|
| JP | 2008054429 | 3/2008 |
| JP | 2008192968 | 8/2008 |
| JP | 2008294385 | 12/2008 |
| KR | 100673028 | 1/2007 |
| KR | 1020070080057 | 8/2007 |
| KR | 100821885 | 4/2008 |
| KR | 1020080032519 | 4/2008 |
| KR | 1020090126323 | 12/2009 |
| WO | WO 2008/044875 | 4/2008 |

* cited by examiner

CORDLESS CHARGING APPARATUS

PRIORITY

This application claims priority under 35 U.S.C. §119(a) to Korean Application Serial No. 10-2102-00127160, which was filed in the Korean Intellectual Property Office on Nov. 12, 2012, the entire content of which is incorporated herein by reference.

BACKGROUND OF THE INVENTION

1. Field of the Invention

The present invention generally relates to a cordless charging apparatus, and more particularly, to a cordless charging apparatus for dispersing heat generated during cordless charging of a portable electronic device.

2. Description of the Related Art

Generally, a portable electronic device refers to a device by which a user accesses various contents while carrying the device, such as a portable terminal, an MP3 player, a Portable Multimedia Player (PMP), or an electronic book. Especially, the portable terminal, usually referred to as a smart phone, has various and diverse functions. The portable terminal has, for example, a Near Field Communication (NFC) module mounted thereon for a certification of a security card of a user certification, a transportation card, a credit card and the like, or a user certification. The portable terminal includes a separate antenna in order to carry out an NFC function. The NFC technology is generally disclosed in Korean Laid-Open Patent Publication No. 2009-126323.

Further, a portable electronic device typically includes a detachable or embedded battery to supply the device with electric power, and a user charges a battery based on a remaining amount of electric power in the battery and uses the portable device. Typical battery charging is classified into wired cable charging and cordless charging. Generally, the wired cable charging has been popularized, but recently various technologies relating to cordless charging have been developed. The cordless charging technologies include an inductive coupling scheme using a magnetic field, a capacitive coupling scheme using an electric field, and a radio frequency wave radiation scheme, such as disclosed in Korean Laid-Open Patent Publication No. 2008-32519.

FIG. 1 schematically illustrates a cordless charging unit for cordless charging, which is embedded in a portable electronic device. FIG. 2 illustrates the portable electronic device having the cordless charging unit and a cordless charging apparatus such as an external charging pad. Referring to FIGS. 1 and 2, the cordless charging device 30 includes a cordless charging unit 12 provided in the portable electronic device 10, and an external charging pad 20 for charging a battery according to a transmission and reception of signals to/from the cordless charging unit 12 on which the portable electronic device 10 is placed. The portable electronic device 10 has a battery (not shown) for supplying electric power thereto. Further, the portable electronic device 10 includes an NFC antenna element 13 in the general form of a loop antenna and the cordless charging unit 12, which are mounted on a side of the battery in the portable electronic device including an NFC function and a cordless charging function. A driving circuit unit 11 is provided on an upper side of the NFC antenna element 13 and the cordless charging unit 12, and connected to the NFC antenna element 13 and the cordless charging unit 12. Furthermore, a shielding material 14 is used in order to shield interference between the NFC antenna element 13 and the cordless charging unit 12 which may be caused by an operation of the NFC antenna element 13 and the cordless charging unit 12, or in order to shield an effect which the operation of the NFC antenna element 13 and the cordless charging unit 12 has on other circuit units in the portable electronic device.

The portable electronic device 10 is provided with a separate charging pad 20 for charging a battery of the portable electronic device 10 which is placed thereon. When the portable electronic device 10 is placed on the charging pad 20 in order to charge the battery, the battery is charged by a cordless resonance between the cordless charging unit 12 and the charging pad 20. However, while the portable electronic device 10 is placed on the charging pad 20 and the battery is charged, the driving circuit unit 11 generates heat with a high temperature. Various dispersing units are provided in the portable electronic device 10, particularly near the driving circuit unit 11, in order to disperse high-temperature heat.

However, the heat generated in the driving circuit unit 11 is typically dispersed into the portable electronic device 10, and a hotspot region where the heat is particularly concentrated on only a part around the driving circuit unit 11 is created and generates heat. Internal modules such as an antenna, a loop antenna and the NFC antenna element 13, which are used for communication of the portable electronic device 10, are disposed around the driving circuit unit 11. Accordingly, the internal modules may have a low performance or be damaged by the high temperature heat generated by the driving circuit unit 11. For example, there are disadvantages in that the NFC antenna element 13 deteriorates due to the high temperature heat, and cordless charging efficiency is lowered. Also, there is problem in that poor charging results.

Moreover, the heat generated in the driving circuit unit 11 is not efficiently dispersed and generates a heat island at which the high temperature heat is collected since the generated heat is not discharged due to spatial limitations in the portable electronic device 10. Therefore, there is a disadvantage in that the heat is concentrated on the driving circuit unit 11 and causes deterioration of the performance of the driving circuit unit 11. Furthermore, in order to disperse the generated heat, a material such as graphite and the like may be disposed on the driving circuit unit 11 so as to disperse the heat. However, there is a problem in that the dispersion of the generated heat is not normally established because of the limitation of the space for dispersing the generated heat in the portable electronic device 10. In addition, it is difficult to secure a space for dispersing heat due to a restricted internal space, as a variety of internal modules are disposed in the portable electronic device 10, and the portable electronic device 10 is slimmed down and miniaturized.

SUMMARY OF THE INVENTION

The present invention has been made to solve the above-mentioned problems in the prior art, and to provide the advantages described below. Accordingly, an aspect of the present invention provides a cordless charging apparatus for efficiently dispersing high-temperature heat which is generated during cordless charging of a portable electronic device.

Another aspect of the present invention provides a cordless charging apparatus capable of dispersing heat, which is generated in a driving circuit unit, to a portion at which the heat has no effect on internal modules such as an antenna, a loop antenna and an NFC antenna element, which are provided in the portable electronic device, particularly around the driving circuit unit.

Still another aspect of the present invention provides a cordless charging device for decreasing a temperature in a hotspot region caused by cordless charging when a battery of the portable electronic device is charged.

In order to achieve the aspects of the present invention, a cordless charging apparatus according to an embodiment of the present invention is provided. The cordless charging apparatus includes a charging pad, a charging module which is disposed on the charging pad and in which electricity is induced by the charging pad so as to cordlessly charge a battery with electric power, and a dispersing member which is disposed in the charging pad and disperses heat generated in the charging module to the charging pad.

BRIEF DESCRIPTION OF THE DRAWINGS

The above and other aspects, features, and advantages of the present disclosure will be more apparent from the following detailed description taken in conjunction with the accompanying drawings, in which.

Figure 1:
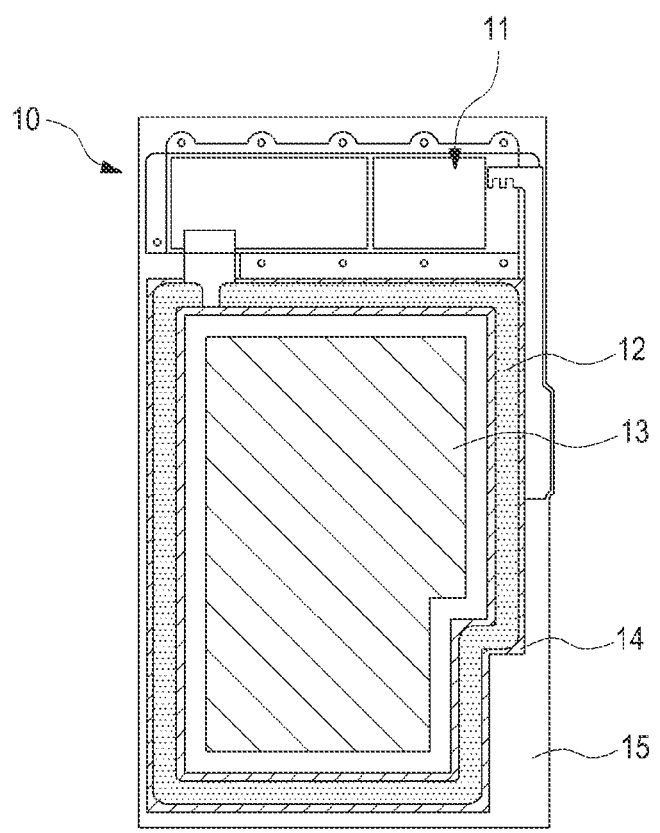
FIG. 1 schematically illustrates a cordless charging unit for cordlessly charging a battery, in which the cordless charging unit is included in a conventional portable electronic device.
Figure 2:
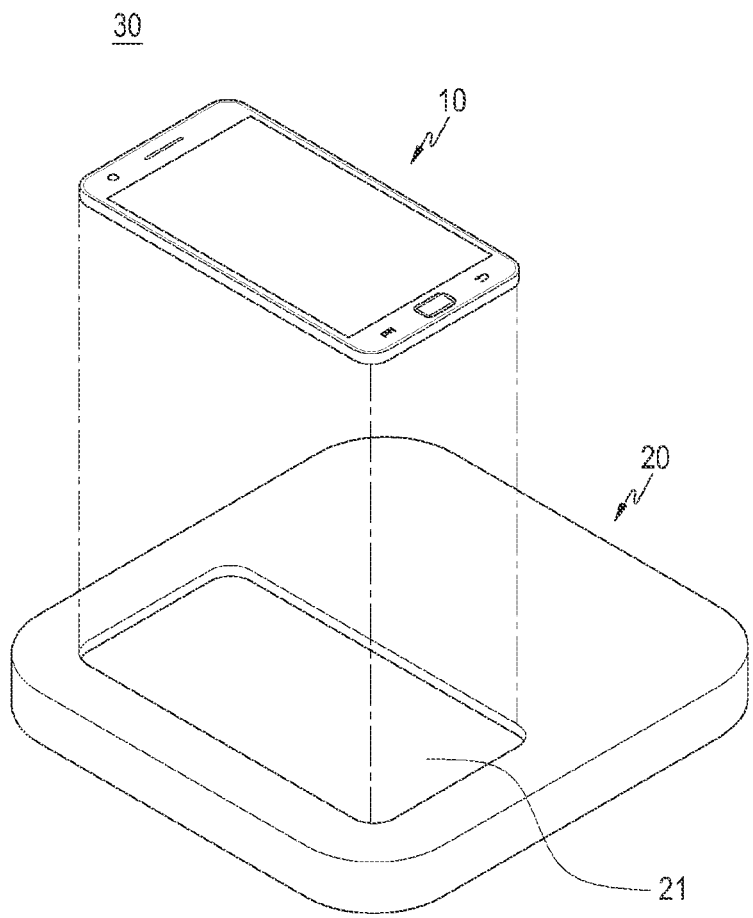
FIG. 2 illustrates a portable electronic device including a cordless charging module and an external charging pad for charging the portable electronic device.

DETAILED DESCRIPTION OF EMBODIMENTS
OF THE PRESENT INVENTION

Hereinafter, a cordless charging apparatus according to the present invention, which includes a heat dispersing unit for dispersing a high-temperature heat, will be described in detail with reference to the accompanying drawings. In the description, a thickness of lines or a size of structural elements in the drawings may be exaggerated for convenience and definition. Further, terms to be described later are defined in consideration of functions in the present Specification, and may be changed according to a user, an intention of an operator, or by convention. Therefore, the definitions of the terms should be determined based on contents throughout the Specification. Furthermore, in the description of the embodiments of the present invention, ordinal numbers such as first and second are used, to merely distinguish objects having the same name from one another. Orders thereof may be arbitrarily determined and the description of a preceding object will be applied to a following object.

The present invention has a structure in that heat generated in a charging module is dispersed outside the charging module, particularly outside a portable electronic device in which the charging module is embedded, in a case where the portable electronic device including the charging module is placed on a charging pad. That is, high-temperature heat generated in the charging module is dispersed to the charging pad, on which the portable electronic device is placed, through a cover of the portable electronic device, so as to decrease the temperature of the charging module. Accordingly, it is possible to prevent generation of a heat island and a hotspot region, and to prevent internal modules mounted on the portable electronic device from being damaged by high-temperature heat. Hereinafter, a cordless charging apparatus will be described with reference to FIGS. 3 to 8.

Figure 3:
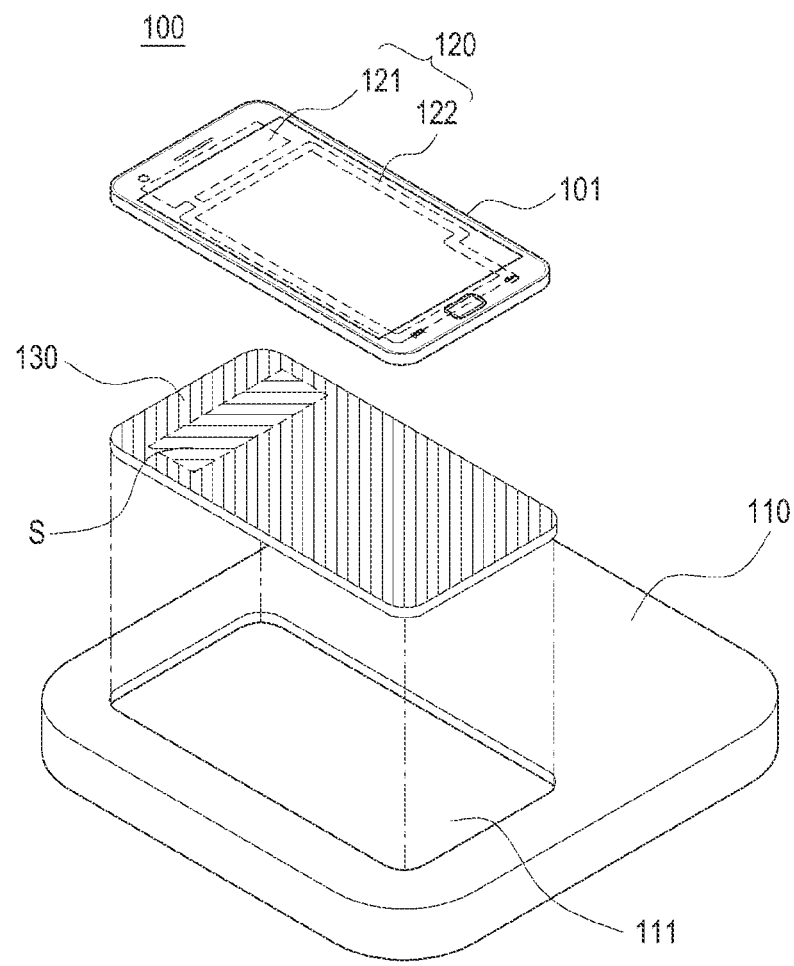
FIG. 3 illustrates a cordless charging device according to an embodiment of the present invention.
Figure 4:
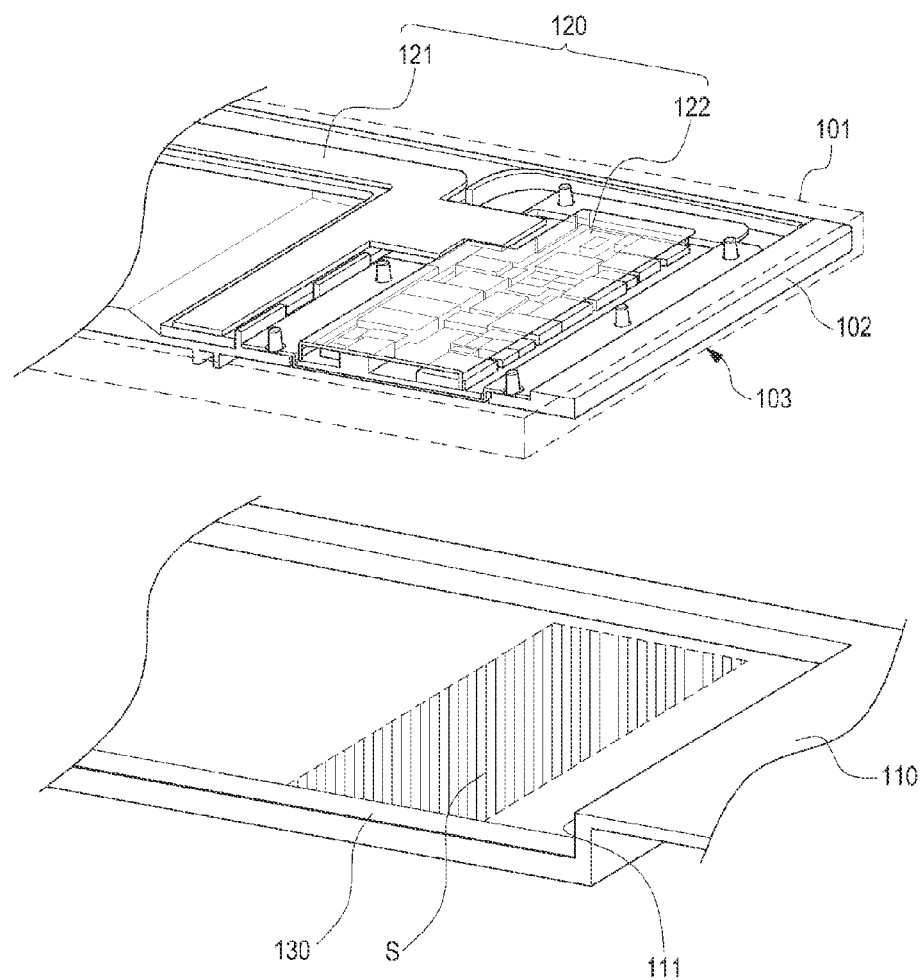
FIG. 4 is a partially enlarged view illustrating a structure of the cordless charging device of FIG. 3.

FIG. 3 illustrates a cordless charging apparatus according to an embodiment of the present invention, and FIG. 4 is a partially enlarged view illustrating a structure of the cordless charging apparatus shown in FIG. 3. Referring to FIGS. 3 and 4, the cordless charging apparatus 100 includes a charging pad 110, a charging module 120 and a dispersing member 130. The charging module 120 is provided in the portable electronic device 101, and is electrically induced by the charging pad 110 to cordlessly charge a battery (not shown) provided in the portable electronic device 101. The charging module 120 is provided in the portable electronic device 101, particularly on a rear surface of a body of the portable electronic device 101. The charging module 120 is provided on a bracket 102 on which an NFC module (not shown) is mounted. The charging module 120 and the battery are covered with a cover 103 provided on the rear surface of the portable electronic device 101. The charging module 120 includes a cordless signal receiving resonance unit 121 and a driving circuit unit 122.

Figure 5:
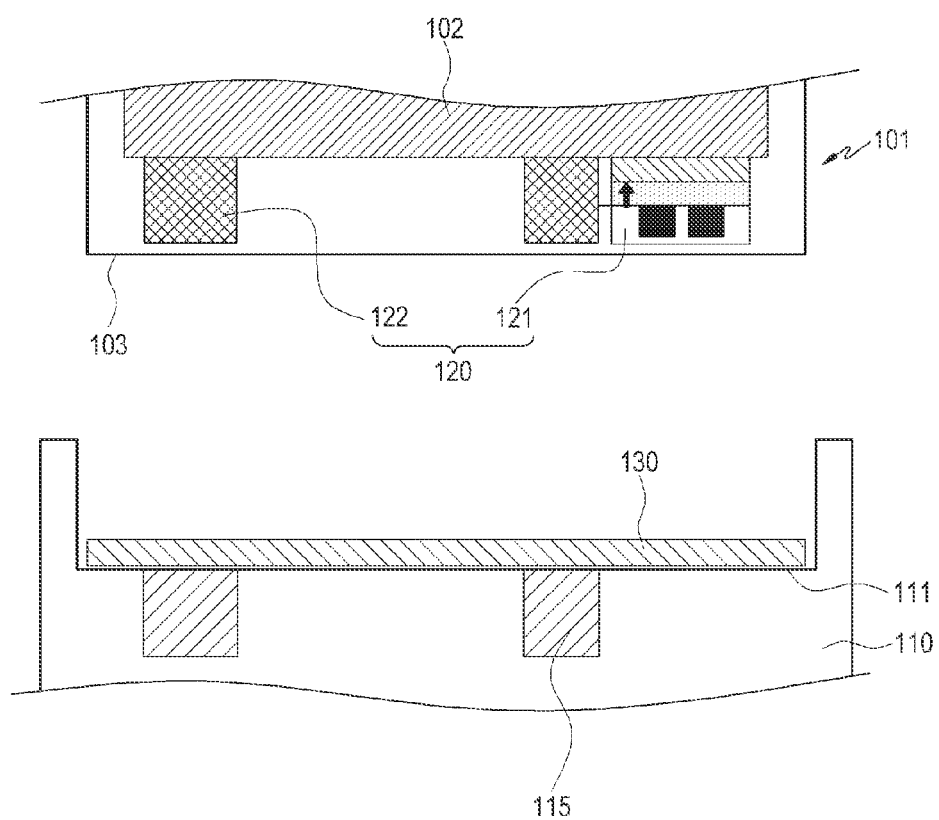
FIG. 5 is a schematic view illustrating the portable electronic device including the charging module of FIG. 3, before the portable electronic device is seated on the charging pad.

Referring to FIG. 5, the cordless signal receiving resonance unit 121 charges the battery using electric power induced by a coil unit 115 which is prepared for the external charging pad 110. If electric power is applied to the external charging pad 110, an electromagnetic field is generated in the coil unit 115 which is provided in the charging pad 110. Therefore, when the portable electronic device 101 is placed on the charging pad 110, the cordless signal receiving resonance unit 121 of the charging module 120 provided in the portable electronic device 101 reacts to the electromagnetic field of the coil unit 115 so as to generate induced electric power. The battery is charged by inductance through a driving circuit unit 122, as described below.

The cordless signal receiving resonance unit 121 may be provided between the bracket 102 and the cover 103 in the portable electronic device 101. Further, the cordless signal receiving resonance unit 121 is mounted along a periphery of the NFC module. The driving circuit unit 122 is disposed on a side, particularly an upper side of the cordless signal receiving resonance unit 121, and electrically connected to the cordless signal receiving resonance unit 121. When the portable electronic device 101 is placed on the external charging pad 110 so that the battery of the portable electronic device 101 is charged, heat is generated from the charging module 120, particularly the driving circuit unit 122. A hotspot region is formed around the driving circuit unit 122 by the heat generated from the driving circuit unit 122. The high-temperature heat is dispersed from the driving circuit unit 122 to the dispersing member 130 (described below) provided on the external charging pad 110 through the cover 103 which covers the battery of the portable electronic device 101. Since the driving circuit unit 122 is disposed on an upper side of the portable electronic device 101, heat is generated from an upper side of the cover 103 of the portable electronic device 101 when the portable electronic device 101 is placed on the charging pad 110 and is charged. Accordingly, when the portable electronic device 101 is placed on a charging region 111 of the charging pad 110, the heat is transferred to an upper side of the charging pad 110 opposite to an upper side of the cover 103, particularly an upper side (hereinafter, referred to as a heat surface (S)) of the dispersing member 130, and the transferred heat is diffused over an entire surface of the dispersing member 130.

The charging pad 110 is provided separately from the portable electronic device 101, and cordlessly charges the battery of the portable electronic device 101 when the portable electronic device 101 is placed on the charging pad 110. The charging pad 110 has the charging region 111 thereon, on which the portable electronic device 101 is placed. In an embodiment of the present invention, the charging region 111 having a groove shape in which the portable electronic device 101 is placed and seated will be described as an example. However, the charging region 111 is not limited to this embodiment. For example, if the charging pad 110 has an overall flat shape and a user recognizes a position at which the portable electronic device 101 is placed, it is possible that the charging region 111 can be changed in shape, structure and form. The charging region 111 has a coil unit 115 disposed therein, which reacts with the charging module 120 to charge the battery. The coil unit 115 reacts with the charging module 120, particularly the cordless signal receiving resonance unit 121 so as to cordlessly charge the battery. The dispersing member 130 is provided on an upper surface of the charging region 111 so as to disperse the heat generated from the charging module 120 when the portable electronic device 101 is charged.

FIG. 5 is a schematic view illustrating the portable electronic device including the charging module of FIG. 3, before the portable electronic device is seated on the charging pad. Referring to FIG. 5, the dispersing member 130 is provided on the upper surface of the charging region 111, and is in contact with the portable electronic device 101 which is placed on the charging region 111. The dispersing member 130 disperses the high-temperature heat generated when the portable electronic device 101 is charged, and disperses the heat generated in the portable electronic device 101 out of the portable electronic device 101, so as to prevent heat accumulation and to decrease the temperature. The dispersing member 130 has a high conductivity to transfer the heat generated from the charging module 120, and is electrically insulated so as to have no effect on a transmission and reception of signals between the coil unit 115 of the charging pad 110 and the cordless signal receiving resonance unit 121 of the charging module 120. In the embodiment of the present invention, a thermally conductive plastic is an example of the dispersing member 130. The thermally conductive plastic is an electrically insulated material. The high temperature heat generated in the driving circuit unit 122 is transferred to the thermally conductive plastic with high thermal conductivity, and dispersed over an entire surface of the thermally conductive plastic so as to decrease the temperature of the driving circuit unit 122. Further, in a case where the portable electronic device 101 is placed on the external charging pad 110 and the battery is charged, since the thermal conductive plastic is electrically insulated and has no effect on inductance generated between the charging module 120 and the charging pad 110, particularly between the cordless signal receiving resonance unit 122 and the coil unit 115, the battery is charged between the charging module 120 and the charging pad 110. Therefore, the dispersing member 130 has no effect on the charging of the battery of the portable electronic device 101, and can effectively disperse the heat which is generated during the charging of the battery.

Figure 6:
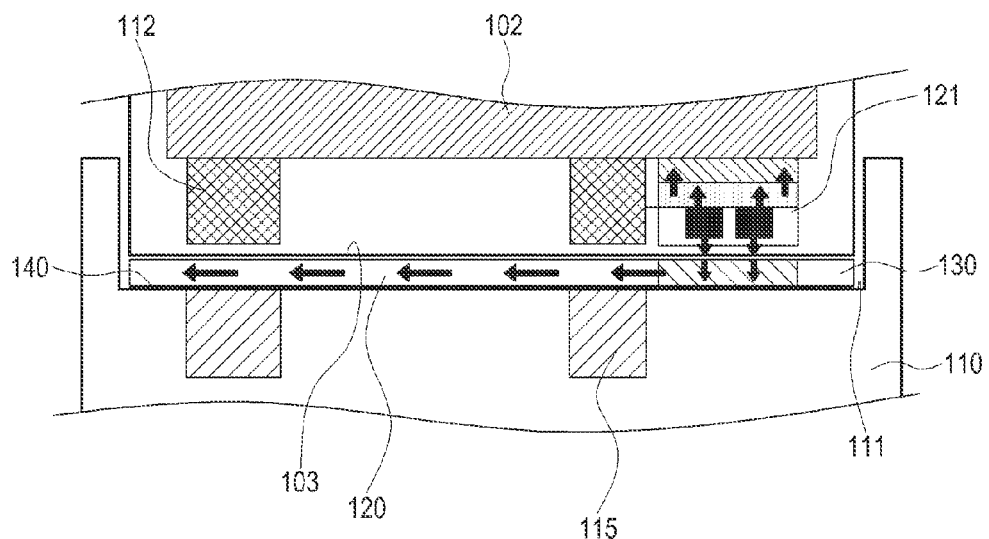
FIG. 6 is a schematic view illustrating the portable electronic device of FIG. 5 after the portable electronic device is seated on the charging pad.
Figure 7:
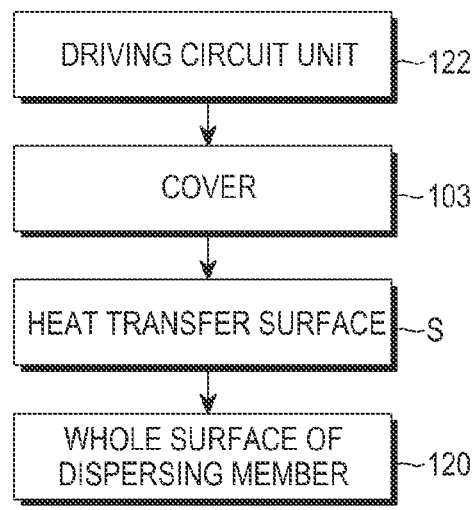
FIG. 7 is a view illustrating heat dispersing conditions when a dispersing member is not provided and when a dispersing member is provided.

FIG. 6 is a view illustrating the portable electronic device of FIG. 5 being seated on the charging pad, and FIG. 7 is a view illustrating a heat dispersing state in which the dispersing member according to the present invention is not provided and in a case where the dispersing member is provided. Referring to FIGS. 6 and 7, when the heat is generated from the driving circuit unit 122, the heat is transferred to the dispersing member 130 which is provided on an exterior of the portable electronic device 101, and heat accumulation in the driving circuit unit 122 is prevented. Accordingly, it is possible to decrease the temperature by about 3° C. at the highest temperature portion in the hotspot region. That is, in a case where the conventional portable electronic device 101 is placed on a charging region 111 which has no dispersing member 130, a portion near the driving circuit unit 122, particularly the hotspot region, has a highest temperature of 49.6° C. However, in a case where the dispersing member 130 is provided on the charging region 111, the hotspot region has a highest temperature of 45.8° C. Accordingly, a difference in temperature of about 3~4° C. is present.

In the embodiment of the present invention, an attachment member 140, such as an adhesive tape, which is disposed between the dispersing member 130 and the charging region 111 in order to attach the dispersing member 130 to the charging region 111 will be described as an example. However, a structure in which the dispersing member 130 is attached to the charging region 111 is not limiting. For example, it is possible to attach the dispersing member 130 to the charging region 111 by thermal bonding, and to form a groove in the charging region 111 and to dispose a hook on a lower surface of the dispersing member 130 so that the hook is latched to the groove. While examples are described in which the dispersing member 130 is attached to the charging region 111 by means of the attachment member 140, heat bonding, or the hook, the present invention is not limited to these examples. For example, it is possible to change the present invention such that a dispersing member 130 is opposite to the portable electronic device 101 to transfer the heat generated during the charging of the battery, and that the charging region 111 is provided with the dispersing member 130 made of a thermally conductive plastic, instead of a separate dispersing member 130 being mounted on an upper side of the charging region 111.

Figure 8A:
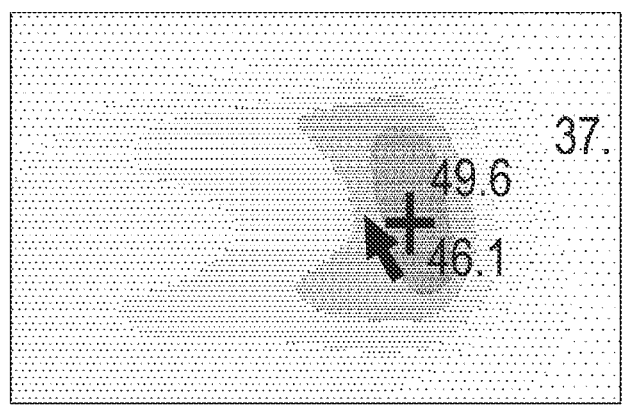
FIGS. 8A and 8B illustrate a heat dispersing path according to the present invention.
Figure 8B:
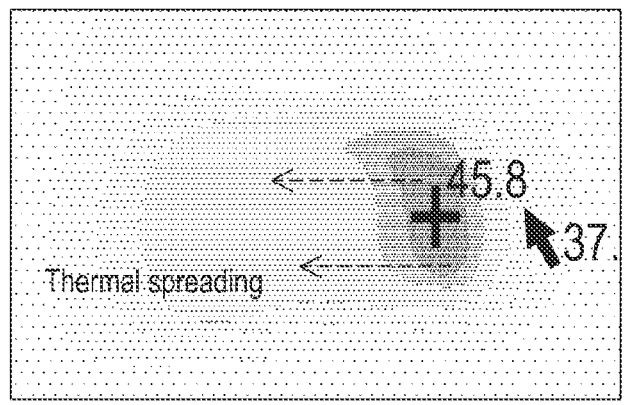

FIGS. 8A and 8B illustrate a heat dispersing path according to the present invention. Referring to FIGS. 8A and 8B, a heat transferring path when cordless charging is carried out through the cordless charging device 100, will be described. First, a user puts the portable electronic device 101 on the external charging pad 110 which is provided separately from the portable electronic device 101, particularly on the charging region 111 of the charging pad 110, in order to charge the battery of the portable electronic device 101. Since the dispersing member 130 is provided on the charging region 111, the portable electronic device 101 is placed on the dispersing member 130 in such a manner that the rear surface of the portable electronic device 101 is in contact with the charging region 111 of the dispersing member 130. Since the dispersing member 130 is provided to be in contact with an entire rear surface of the portable electronic device 101, the dispersing region 111 has an identical size to that of the charging region 111 and can disperse the heat. If electric power is applied to the external charging pad 110, an electromagnetic force is generated at the coil unit 115 provided in the charging pad 110, particularly in the charging region 111. Since the cordless signal receiving resonance unit 122 is provided at a position opposite to the coil unit 115 in the portable electronic device 101, electricity is induced in the cordless signal receiving resonance unit 122 by the electromagnetic force generated in the coil unit 115. The high-temperature heat is generated in the driving circuit unit 122 disposed on the upper side of the cordless signal receiving resonance unit 122 during the cordless charging, and accumulates around the driving circuit unit 122. Accordingly, the high-temperature heat generated from the driving circuit unit 122 is transferred to the dispersing member 130, particularly a heat transfer surface (S), which has relatively excellent thermal conductivity, through the cover 103 opposite to the driving circuit unit 122. The heat transferred to the heat transfer surface (S) is transferred to and dispersed over the whole surface of the dispersing member 130 because the dispersing member 130 has high thermal conductivity.

Therefore, the high-temperature heat generated from the charging module 120 is transferred and dispersed out of the portable electronic device 101 to dispersing member 130, which is made of a material different from that of the portable electronic device 101. Accordingly, the modules provided in the portable electronic device 101 can be prevented from being damaged due to the high-temperature heat. Further, since the heat generated in the portable electronic device 101 is dispersed not in a restricted space in the portable electronic device 101 but out of the portable electronic device 101 to the dispersing member 130, the temperature of the generated heat can be decreased considerably.

In the cordless charging apparatus having the structure as described above, since the heat generated while the portable electronic device is placed on the charging pad and is charged is dispersed from the portable electronic device to the charging pad, there is an advantage in that the heat generated from the driving circuit unit can be effectively dispersed. Further, the high-temperature heat generated from the driving circuit unit is discharged out of the portable electronic device, thereby preventing the internal modules such as the antenna, the loop antenna and the NFC antenna element, which are disposed in the portable electronic device for the communication, from being damaged due to the heat.

Furthermore, in a case where the heat generated from the driving circuit unit is dispersed outside the portable electronic device, a decrease of the temperature is larger than that when the heat is dispersed in the portable electronic device. Accordingly, there is an advantage in that a local saturation region of the temperature according to the cordless charging is prevented from being generated.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A wireless power charging system, comprising:
   a charging pad configured to wirelessly provide power to an electronic device; and
   the electronic device configured to be placed on a dispersing member disposed on the charging pad to receive the wirelessly provided power from the charging pad, and charge a battery of the electronic device with the wirelessly provided power from the charging pad,
   wherein the dispersing member disperses heat generated from the electronic device, toward the charging pad,
   wherein the electronic device includes a charging module which charges the battery with the wirelessly provided power received from the charging pad, and
   wherein the dispersing member has heat conductivity, is electrically insulated, and includes a thermally conductive plastic.

2. The wireless power charging system as claimed in claim 1, wherein the charging pad has a charging region on which the electronic device is seated, and the dispersing member is provided on the charging region so as to disperse the heat which is generated from the charging module.

3. The wireless power charging system as claimed in claim 1, wherein the thermally conductive plastic receives and disperses the heat generated from the charging module.

4. The wireless power charging system as claimed in claim 1, wherein the thermally conductive plastic is attached to an external surface of the charging region by at least one of a heat bonding, an adhesive member and a hook coupling.

5. The wireless power charging system as claimed in claim 2, wherein the battery is disposed on a surface of the charging module, and a cover is provided to cover the charging module and the battery, and wherein the heat generated from the charging module is dispersed toward the dispersing member through the cover.

6. The wireless power charging system as claimed in claim 5, wherein the charging module includes a cordless signal receiving resonance unit which performs cordless charging; and a driving circuit unit which is connected to a side of the cordless signal receiving resonance unit, and wherein the heat generated from the driving circuit unit is dispersed toward the dispersing member through the cover opposite to the driving circuit unit when the electronic device is placed on the charging pad to charge the battery.

7. A wireless power charging system, comprising:
   a charging pad on which an electronic device is placed, the electronic device being associated with the charging pad to wirelessly charge a battery in the electronic device; and
   a dispersing member which disperses heatgenerated from the electronic device, toward the charging pad,
   wherein the dispersing member disperses heat generated by a charging module included in the electronic device, the charging module charging the battery with the charging pad, and
   wherein the dispersing member has heat conductivity, is electrically insulated, and includes a thermally conductive plastic.

* * * * *